J. T. HOLTE.
BROOM HOLDER.
APPLICATION FILED APR. 23, 1909.
959,139.
Patented May 24, 1910.
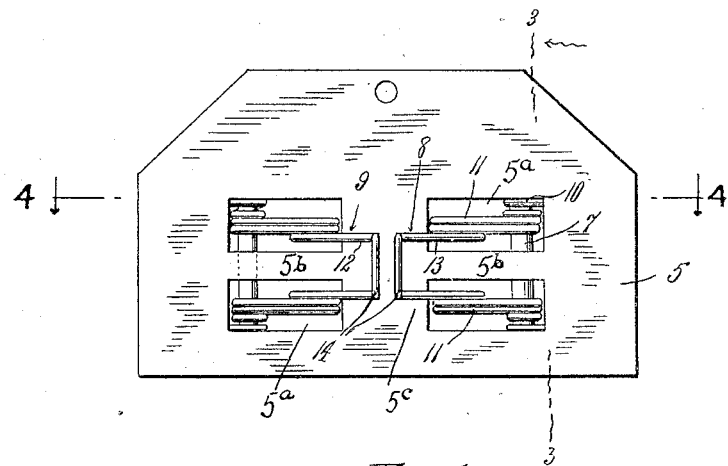
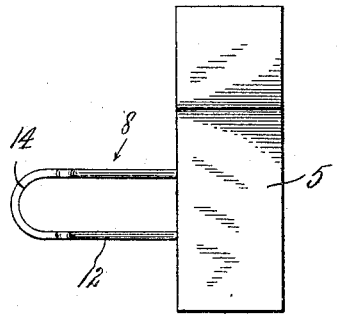
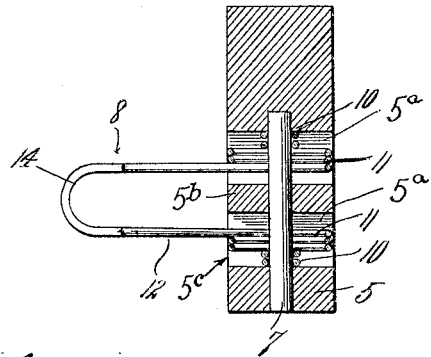
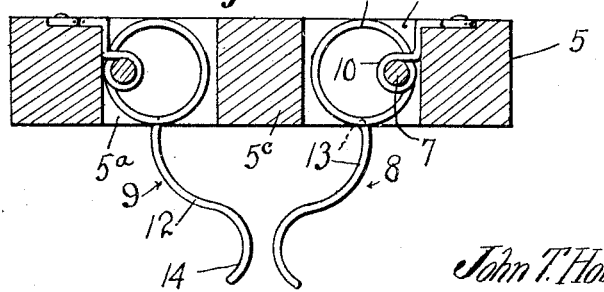

UNITED STATES PATENT OFFICE.

JOHN T. HOLTE, OF MOORHEAD, MINNESOTA.

BROOM-HOLDER.

959,139.　　　　Specification of Letters Patent.　　Patented May 24, 1910.

Application filed April 23, 1909.　Serial No. 491,751.

*To all whom it may concern:*

Be it known that I, JOHN T. HOLTE, a citizen of the United States, residing at Moorhead, in the county of Clay, State of Minnesota, have invented certain new and useful Improvements in Broom-Holders; and I do hereby declare the following to be a full, clear, and exact description of the invention, such as will enable others skilled in the art to which it appertains to make and use the same.

This invention relates to improvements in article holding devices and more particularly to the type known as broom holders.

It has for one of its objects the provision of a device of that kind designed to hold a broom supported above the floor in such manner that there will be no danger of the broom handle breaking, by accidental contact with other objects.

A further object is the provision of a device which is comparatively simple in structure, inexpensive to manufacture, and so arranged that the broom may be taken from the holder without the danger of scraping the hand against the wall.

With these and other objects in view as will more fully hereinafter appear, the present invention consists in certain novel details of construction and arrangement of parts, hereinafter fully described, illustrated in the accompanying drawings and more particularly pointed out in the appended claims. It being understood that various changes in the form, proportion, size and minor details of the device may be made without departing from the spirit or sacrificing any of the advantages of the invention.

In the accompanying drawings forming part of this specification, Figure 1 is a front elevation of the device. Fig. 2 is an end view of the same. Fig. 3 is a sectional end view on the line 3—3 of Fig. 1. Fig. 4 is a horizontal sectional view on the plane indicated by the line 4—4 of Fig. 1.

In the embodiment of my improved broom holder I provide a base block 5, which is here shown as oblong, is preferably of wood and is provided adjacent either end with a pair of oblong openings 5$^a$ arranged in a vertical plane, the openings of each pair being spaced apart by a horizontal wall 5$^b$ and the said pairs of openings being spaced apart by a vertical wall 5$^c$. Pins 7 are fitted in transverse openings in the block and extend through the openings 5$^a$ near the outer ends of the latter. I also provide a pair of spring clamps 8 and 9, each of which is formed of a single piece of spring wire of suitable length and gage. The wire constituting each clamp is first doubled and bent to form a substantially U-shaped jaw 12, the outer portion of which is semi-circular in form as at 14. The arms of the jaw are bent at a suitable distance from the end 14, of the jaw to form a plurality of coils 11, the diameter of which is about equal to the thickness of the block and the said coils are disposed in the openings 5$^a$ of the block and eccentrically with respect to one of the pins 7. The extreme end portions of the wire constituting each clamp are bent to form coils 10, which are of less diameter than the coils 11, are eccentric thereto and closely encircle the pins 7, the terminals of the wire being secured to the base so that the said clamps are prevented from turning on the pins. The jaws 12 of the clamps curve outwardly from the block and toward each other and their extreme outer ends are reversely slightly out-curved as shown at Fig. 4 to facilitate the insertion of a broom handle between them, the coils 11 acting to cause the said jaws to clamp firmly on opposite sides of the broom handle so that the broom handle is held between the jaws of the clamps and against the outer side of the block, said spring coils 11, as will be obvious, permitting the jaws to yield as may be required to enable a broom handle to be placed between them or removed from between them. Owing to the fact that the diameter of the spring coils 11 is equal to the thickness of the block the said spring coils which are placed in the openings 5$^a$ are entirely housed within said openings and do not project from either side of the block and the surfaces of the block are unobstructed excepting by the jaws 12 of the clamps. Hence my improved broom holder is compact and the spring coils which actuate the jaws of its clamps are not exposed and hence are not likely to become injured.

What is claimed as new, is:—

1. The herein described broom holder comprising a block having openings therein, clamping jaws having actuating spring coils housed in the said openings, bearing coils also in said openings and pins in said block extending through said openings and through the spring coils and bearing coils of the said clamps.

2. The herein described broom holder comprising a base having openings therein, clamping jaws each comprising a U-shaped spring having spring coils on its arms housed in said openings and bearing coils of less diameter than said spring coils and also in said openings and pins in said base extending through said openings, said spring coils and engaged by said bearing coils.

In testimony whereof, I affix my signature, in presence of two witnesses.

JOHN T. HOLTE.

Witnesses:
GEO. E. PERLEY,
CLARA M. BEKKEN.